INVENTORS
JAMES H. LEONARD
EDWARD P. DESSERT
BY Paul J. Rose 3,346,777
ELECTRIC CIRCUIT BREAKER AND
MOUNTING MEANS THEREFOR
James H. Leonard and Edward P. Dessert, Cedar Rapids, Iowa, assignors to Square D Company, Park Ridge, Ill., a corporation of Michigan
Filed Dec. 20, 1966, Ser. No. 603,366
10 Claims. (Cl. 317—119)

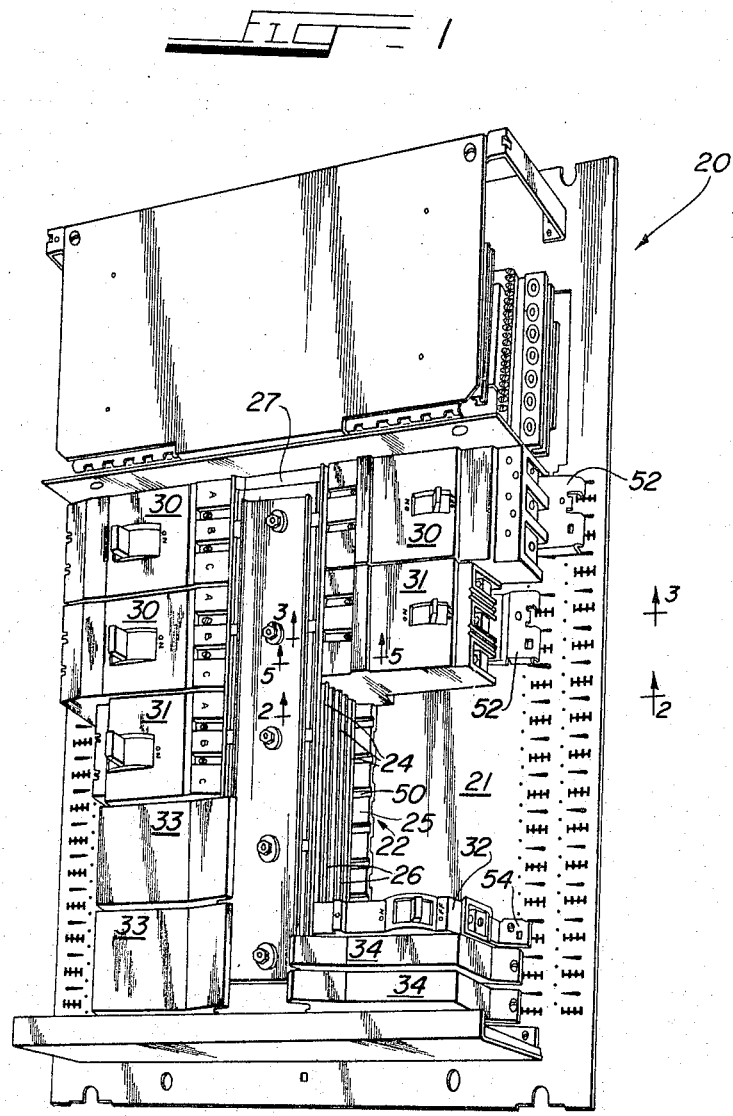

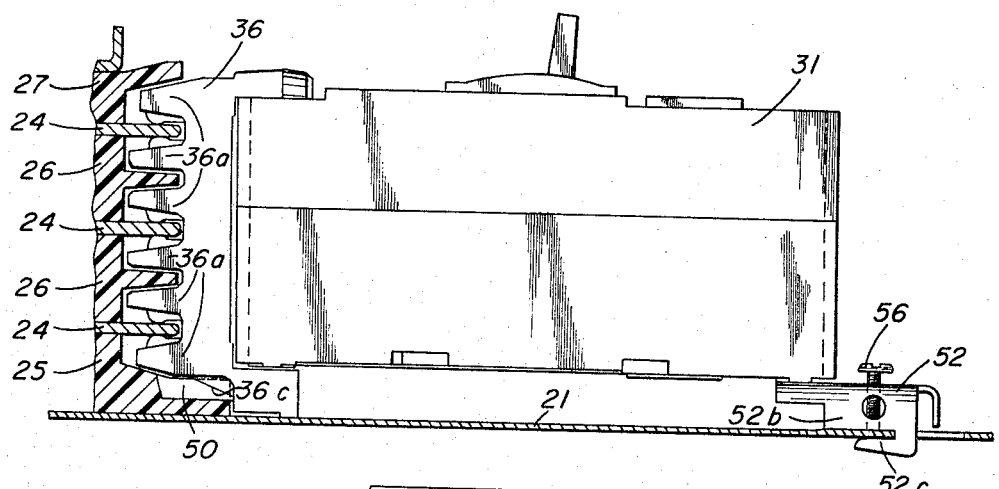
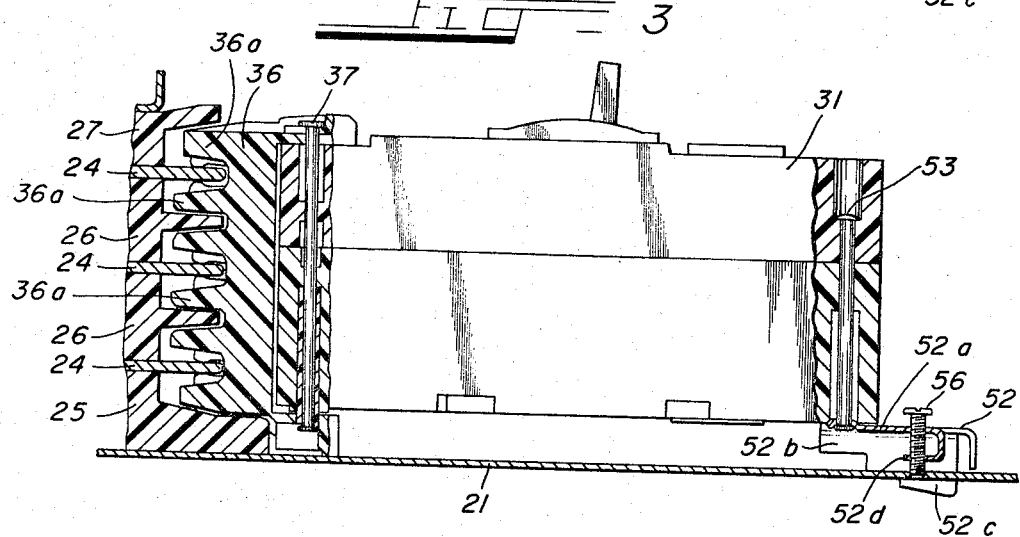
INVENTORS
JAMES H. LEONARD
EDWARD P. DESSERT
BY Paul J. Rose

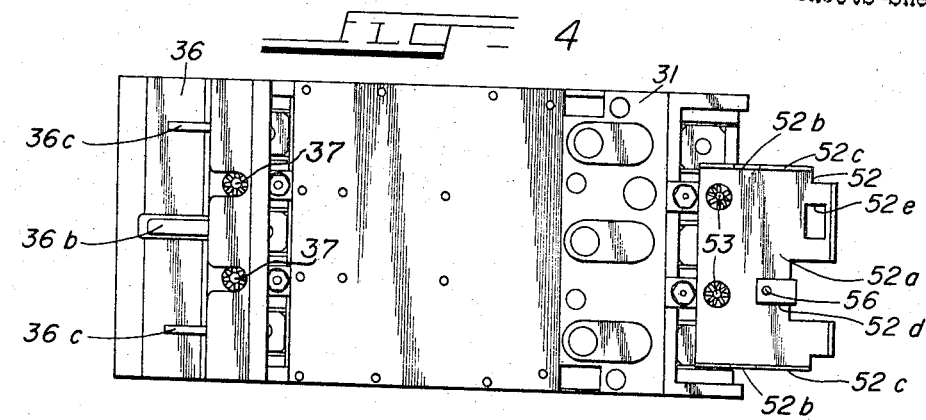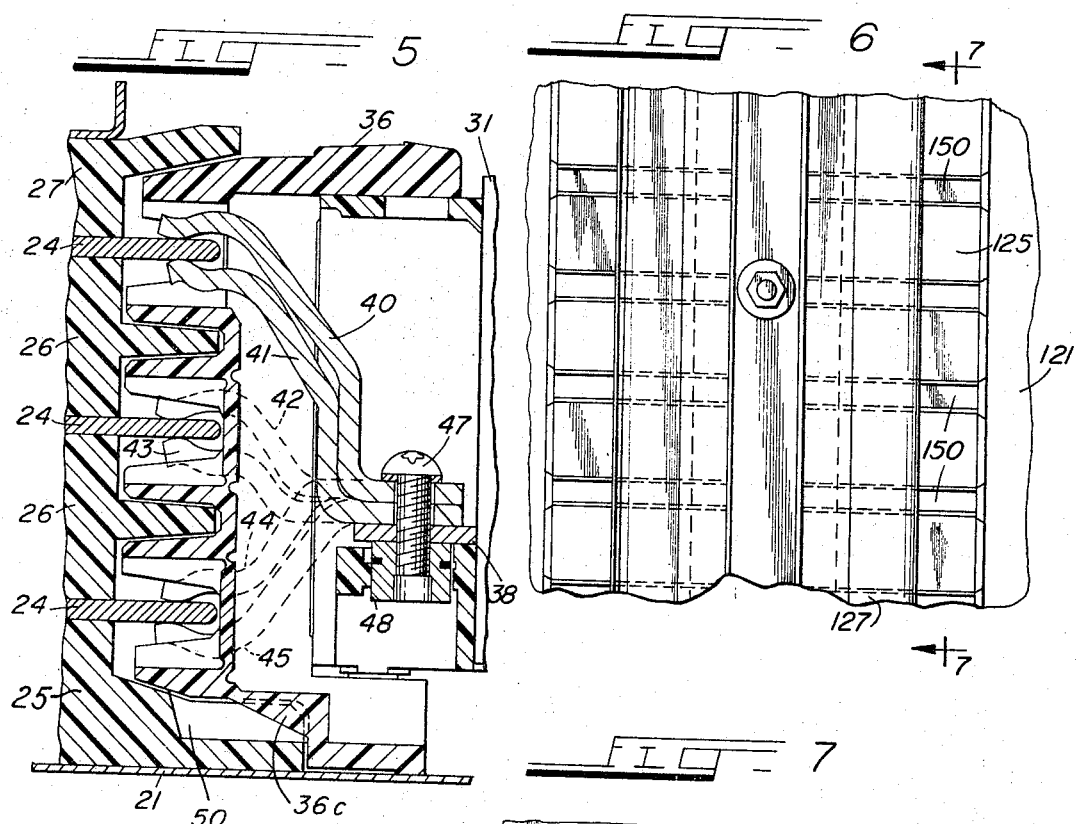

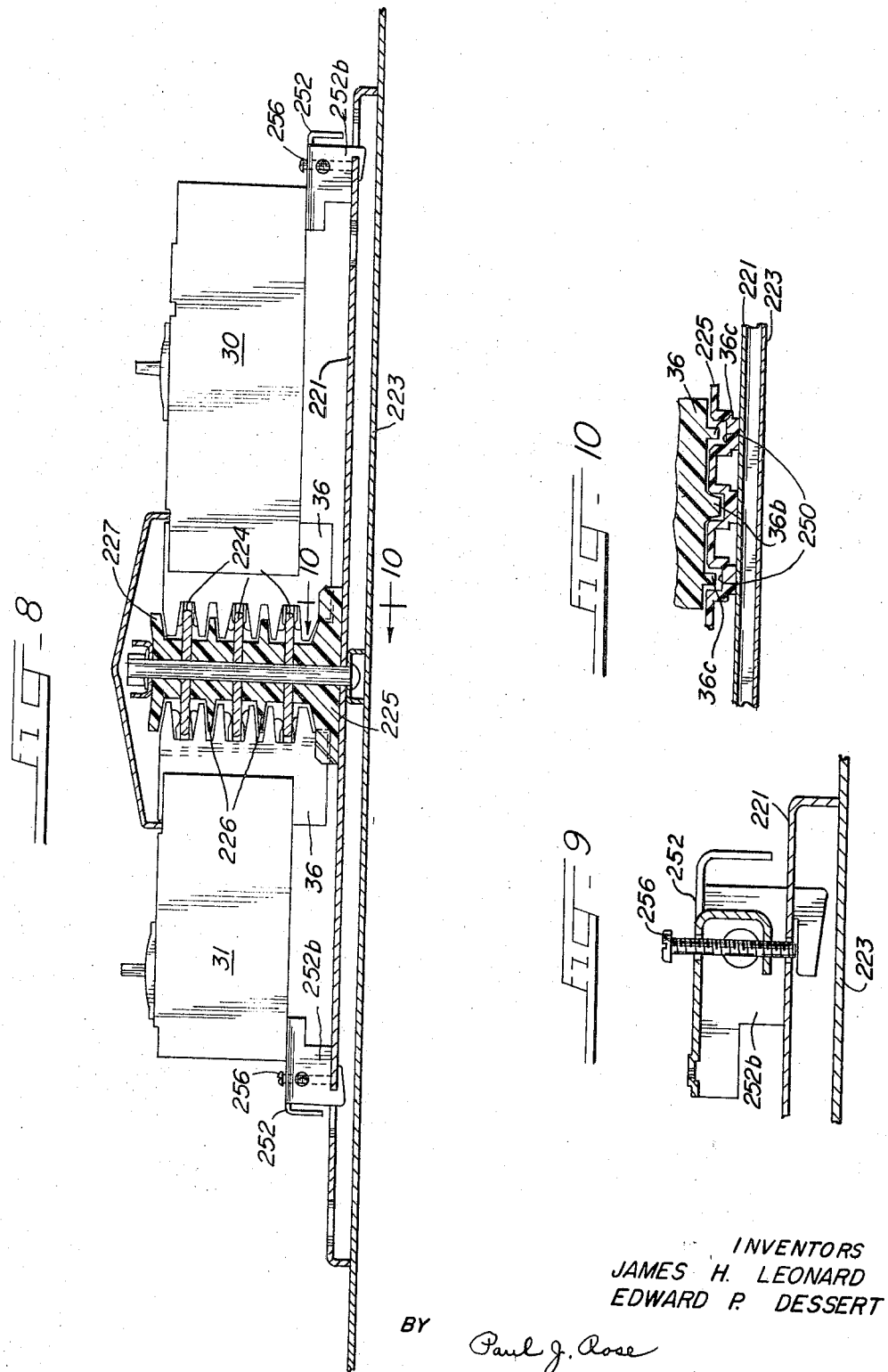

ABSTRACT OF THE DISCLOSURE

A molded-case electric circuit breaker having plug-on jaws in one end portion of the casing and a mounting bracket secured to the other end portion of the casing, the circuit breaker being moved endwise in a direction parallel to a generally flat mounting pan of an electrical panelboard to plug the jaws on edge portions of flat bus bars stacked with their flat sides parallel to the mounting pan, and the mounting bracket cooperating with the mounting pan to hold the jaws of the circuit breaker securely on the bus bars.

Summary of the invention

An object of the invention is to provide a molded-case electric circuit breaker and mounting means therefor, the circuit breaker having a set of plug-on jaws engageable with an edge portion of a flat bus bar mounted on a generally flat mounting pan with its flat sides parallel to the mounting pan, the engagement of the jaws with the bus bar being effected by movement of the circuit breaker endwise in a direction parallel to the mounting pan, and the mounting pan having portions cooperable with a bracket on the circuit breaker to enable the jaws to be pried on and off the bus bar and to maintain the circuit breaker in mounted position with the jaws engaging the bus bar.

Brief description of the drawings

FIG. 1 is a perspective view of an electrical panelboard and a plurality of circuit breakers constructed in accordance with the invention mounted thereon, a box and certain trim panels being omitted;

FIG. 2 is a fragmentary sectional view taken generally along the line 2—2 of FIG. 1;

FIG. 3 is a fragmentary sectional view taken generally along the line 3—3 of FIG. 1;

FIG. 4 is a rear view of the circuit breaker of FIGS. 2 and 3;

FIG. 5 is an enlarged fragmentary sectional view taken generally along the line 5—5 of FIG. 1;

FIG. 6 is a fragmentary front view of a central portion of an electrical panelboard similar to that of FIG. 1;

FIG. 7 is a fragmentary sectional view taken generally along the line 7—7 of FIG. 6;

FIG. 8 is a transverse sectional view of an electrical panelboard similar to that of FIG. 1 and a pair of circuit breakers constructed in accordance with the invention mounted thereon;

FIG. 9 is an enlarged fragmentary sectional view of the right-hand portion of FIG. 8 taken at the fastening screw of the bracket in a manner similar to the right-hand portion of FIG. 3;

FIG. 10 is a fragmentary sectional view taken generally along the line 10—10 of FIG. 8;

Description of the preferred embodiment

Figure 11:
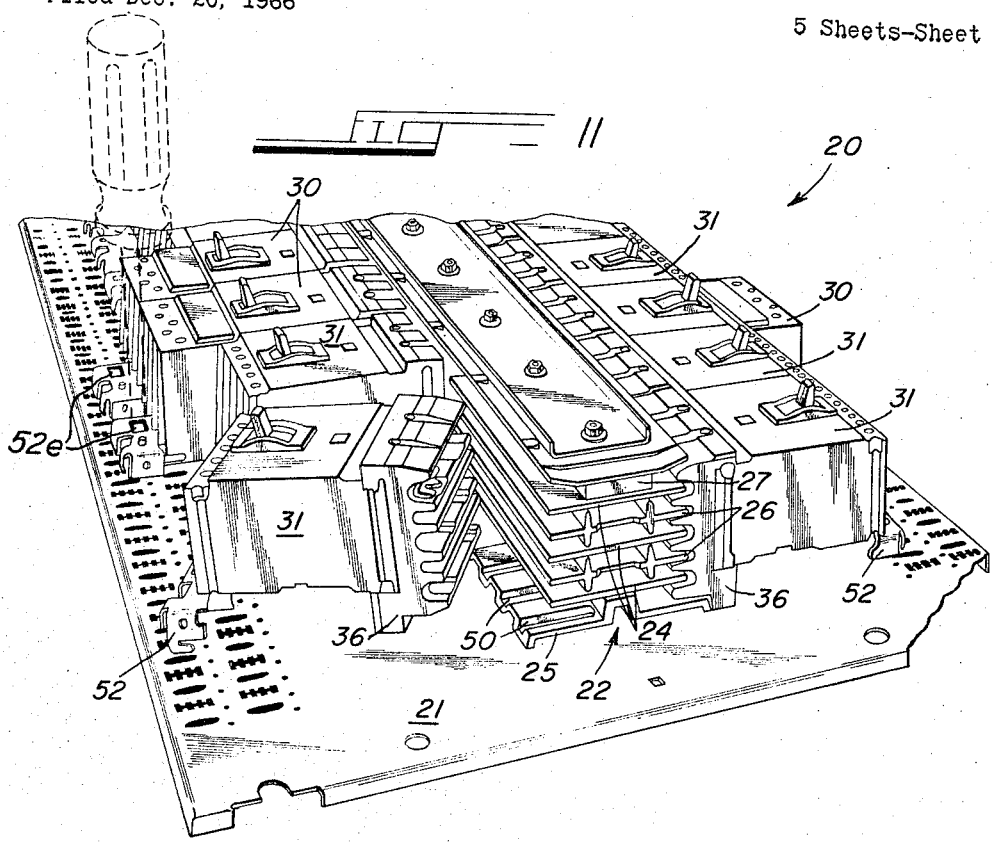
FIG. 11 is a fragmentary perspective view of the electrical panelboard of FIG. 1, a plurality of circuit breakers constructed in accordance with the invention being mounted thereon and one circuit breaker constructed in accordance with the invention being shown in the process of being mounted.

FIGS. 1 and 11 show an electrical panelboard 20 including a mounting pan 21 having a stack 22 of elongated insulators and flat bus bars secured thereto centrally thereof, the stack 22 including three flat bus bars 24 interleaved between a rear insulator 25, two intermediate insulators 26, and a front insulator 27. Mounted on the mounting pan 21 in FIG. 1 are three relatively large three-pole molded-case circuit breakers 30, two relatively small three-pole molded-case circuit breakers 31, a relatively small single-pole molded-case circuit breaker 32, two blank fillers 33 each having a width of three pole spaces, and two blank fillers 34 each having a width of one pole space. Mounted on the mounting pan 21 and fully shown in FIG. 11 are three of the circuit breakers 30 and four of the circuit breakers 31, one circuit breaker 31 being shown in the process of being mounted.

Each of the circuit breakers 30 and 31 is provided with a shroud 36 secured to the casing of the respective circuit breaker by a pair of rivets 37, as best shown in FIGS. 3 and 4. Each pole of each of the three-pole circuit breakers 30 and 31 is provided with a terminal strap such as a terminal strap 38 shown in FIG. 5, the terminal strap of one pole having a pair of plug-on jaw members 40 and 41 secured thereto and adapted to be plugged on the front one of the bus bars 24, the terminal strap of a second pole having a pair of plug-on jaw members 42 and 43 secured thereto and adapted to be plugged on the middle one of the bus bars 24, and the terminal strap of a third pole having a pair of plug-on jaw members 44 and 45 secured thereto and adapted to be plugged on the rear one of the bus bars 24, as shown in FIG. 5, the pairs of jaw members being secured to their respective terminal straps by a screw and nut, such as a screw 47 and nut 48 (FIG. 5).

Each single-pole circuit breaker 32 is provided with a shroud similar to the shroud 36, but having a width of one pole space. Further, each circuit breaker 32 is provided with a pair of the jaw members 40 and 41, or with a pair of the jaw members 42 and 43, or with a pair of the jaw members 44 and 45, depending on which of the bus bars 24 it is to be connected to.

Each shroud 36 is provided with a plurality of finger portions 36a interleavable between the edge portions of the bus bars 24 and the insulators 25, 26, and 27, as best shown in FIGS. 2 and 3. The rear of each shroud 36 is provided with a relatively large central rib 36b and a pair of relatively smaller ribs 36c centered in the two outer pole spaces of the respective circuit breaker, as shown in FIG. 4.

The rear insulator 25 is provided with a plurality of spaced grooves 50. The grooves 50 are identical with a plurality of grooves 150 in a rear insulator 125 (FIGS. 6 and 7) secured to a mounting pan 121 along with a plurality of bus bars 124, intermediate insulators 126, and a front insulator 127. The grooves 50 are also identical to a plurality of grooves 250 in a rear insulator 225 (FIGS. 8 and 10) secured to a mounting pan 221 along with a plurality of bus bars 224, intermediate insulators 226, and a front insulator 227, the mounting pan 221 being secured to a rear wall portion of a box 223. FIG. 10 illustrates how the ribs 36b and 36c of the shroud 36 fit in the grooves 250 of the rear insulator 225, and thus how they would also fit in the grooves 50 of the rear insulator 25 and in the grooves 150 of the rear insulator 125.

Each of the circuit breakers 30 and 31 in FIGS. 1 and 11 is provided with a mounting bracket 52 secured to the respective circuit breaker by a pair of rivets 53, as shown in FIGS. 3 and 4, the single-pole circuit breaker 32 being provided with a similar, but narrower mounting bracket 54 (FIG. 1).

Each bracket 52 is generally U-shaped and includes a bight portion 52a (FIG. 4) and a pair of spaced leg portions 52b the free end portions of which are provided respectively with a pair of hook portions 52c (FIGS. 2 and 3). The bight portion 52a is provided with a reversely bent tongue portion 52d. A retaining screw 56 extends through a suitable opening in the bight portion 52a and is threaded into the tongue portion 52d. A rectangular aperture 52e (FIG. 4) is provided in the bight portion 52a.

Figure 12:
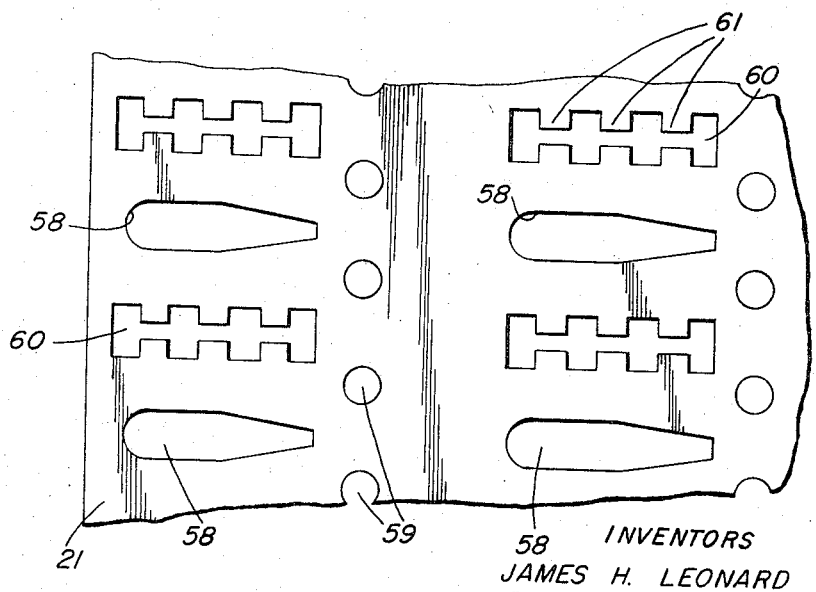
FIG. 12 is a detail view of a portion of a mounting pan of the electrical panelboard of FIGS. 1 and 11.

Each of the mounting pans 21, 121, and 221 is provided with a plurality of elongated holes 58, a plurality of round holes 59, and a plurality of elongated holes 60 in the pattern shown in FIG. 12 for the mounting pan 21, the holes 60 being partially defined by oppositely and inwardly extending tongue portions 61.

The circuit breakers 30 and 31 of FIG. 8 are provided with mounting brackets 252 similar to the brackets 52 but having longer leg portions 252b and longer retaining screws 256.

In mounting a circuit breaker 31 in the panelboard 20, the rib 36b on the shroud 36 is aligned with one of the grooves 50 in the rear insulator 25 and the hook portions 52c of the bracket 52 are inserted respectively through an appropriate pair of the holes 58 in the mounting pan 21. The tip of a screwdriver or other appropriate tool is then inserted through the aperture 52e in the bracket 52 and into the corresponding hole 60 in the mounting pan 21, and the handle of the tool is moved toward the bus bars 24 to force the pairs of plug-on jaw members 40 and 41, 42 and 43, and 44 and 45 respectively thereon. Several prying steps may be used, with the tip of the tool engaging successive pairs of the tongue portions 61. When the circuit breaker is in the proper position, the screw 56 is turned until the tip enters the appropriate hole 59 in the mounting pan 21, as shown in FIG. 3, to maintain the circuit breaker in mounted position, with the plug-on jaw members properly engaged with the edge portions of the bus bars 24. The hook portions 52c prevent the pulling of the circuit breaker away from the mounting pan 21 at the end portion of the circuit breaker having the bracket 52.

The reverse procedure may be used to remove a circuit breaker from a panelboard.

We claim:

1. An electrical panelboard comprising a generally flat mounting pan, a plurality of elongated flat bus bars of substantially the same cross sectional shape, and a plurality of elongated insulators, said bus bars being interleaved between said insulators to form a stack, said insulators being substantially coextensive longitudinally with said bus bars, said stack of insulators and bus bars being secured to said mounting pan with the flat sides of said bus bars parallel to said mounting pan and a rear one of said insulators disposed between said mounting pan and a rear one of said bus bars, and a portion of said rear insulator adjacent said mounting pan projecting beyond said bus bars transversely thereof in a direction parallel to said mounting pan and having a plurality of locating means thereon equally spaced longitudinally along said rear insulator and adapted to cooperate selectively with complementary locating means on a casing of a circuit breaker upon endwise movement of the circuit breaker for electrically connecting the circuit breaker to the bus bars.

2. An electrical panelboard as claimed in claim 1, wherein said plurality of locating means on said rear insulator is a plurality of transversely extending grooves in said rear insulator equally spaced longitudinally therealong.

3. An electrical panelboard as claimed in claim 1, wherein said mounting pan has two parallel rows of equally spaced openings therein, said rows of openings extending longitudinally of said bus bars and being disposed transversely thereof on one side thereof, all the openings of one row providing means to selectively receive an end portion of a screw mounted in a circuit breaker mounting bracket, alternate openings of the other row providing means to selectively receive a hook portion of a circuit breaker mounting bracket, and the remaining openings of said other row respectively between said alternate openings providing means to selectively receive an end portion of a prying tool, said panelboard having an electric circuit breaker mounted therein, said circuit breaker comprising an elongated molded casing having a shroud portion adjacent one end, said shroud portion having a plurality of finger portions interleaved between said bus bars and insulators and having locating means cooperatively engaged with one of the locating means on said rear insulator, a plurality of plug-in terminal means extending outwardly through said shroud portion and respectively engaged with said plurality of bus bars, a mounting bracket secured to the other end portion of said casing, said mounting bracket including a hook portion disposed on a rear side of said mounting pan and extending beyond an edge of one of said alternate openings of said other row of openings in said mounting pan from a portion of said mounting bracket disposed in said one of said alternate openings, and a screw mounted in said mounting bracket and having an end portion received in one of the openings of said one row of openings in said mounting pan.

4. An electrical panelboard as claimed in claim 1, wherein said mounting pan has two parallel rows of equally spaced openings therein, said rows of openings extending longitudinally of said bus bars and being disposed transversely thereof on one side thereof, all the openings of one row providing means to selectively receive an end portion of a screw mounted in a circuit breaker mounting bracket, alternate openings of the other row providing means to selectively receive a hook portion of a circuit breaker mounting bracket, and the remaining openings of said other row respectively between said alternate openings providing means to selectively receive an end portion of a prying tool.

5. An electrical panelboard including a generally flat and rectangular mounting pan, said mounting pan having two parallel rows of equally spaced openings therein, said rows of openings extending along one longitudinal edge portion of said mounting pan, all the openings of one row providing means to selectively receive an end portion of a screw mounted in a circuit breaker mounting bracket, alternate openings of the other row providing means to selectively receive a hook portion of a circuit breaker mounting bracket, and the remaining openings of said other row respectively between said alternate openings providing means to selectively receive an end portion of a prying tool.

6. An electrical panelboard as claimed in claim 5, wherein said remaining openings of said other row are partially defined by a plurality of inwardly and oppositely extending pairs of tongue portions of said mounting pan.

7. For installation in an electrical panelboard including a generally flat mounting pan having an opening therein and having a bus bar mounted thereon, an electric circuit breaker comprising an elongated molded casing, plug-in terminal means extending outwardly through one end portion of said casing and engageable with the bus bar on the mounting pan by endwise movement of said casing parallel to the mounting pan, and a mounting bracket secured to the other end portion of said casing, said mounting bracket including a hook portion, said hook portion being receivable in the opening in the mounting pan and movable beyond an edge of the opening in the mounting pan upon endwise movement of said casing toward the bus bar on the mounting pan to engage said plug-in terminal means therewith.

8. For installation in an electrical panelboard including a generally flat mounting pan having a first and a second opening therein and having a bus bar mounted thereon, an electric circuit breaker as claimed in claim 7 wherein said hook portion is receivable in the first opening in the mounting pan and movable beyond an edge of the first opening in the mounting pan upon endwise movement of said casing toward the bus bar on the mounting pan to engage said plug-in terminal means therewith, and including a screw mounted in said mounting bracket and receivable in the second opening in the mounting pan to prevent endwise movement of said casing away from the bus bar on the mounting pan.

9. For installation in an electrical panelboard including a generally flat mounting pan having a plurality of bus bars and a plurality of insulators mounted thereon in interleaved relationship, one of the insulators having locating means thereon, an electric circuit breaker comprising an elongated molded casing having a shroud portion adjacent one end, and a plurality of plug-in terminal means extending outwardly through said shroud portion and engageable respectively with the bus bars on the mounting pan by endwise movement of said casing parallel to the mounting pan, said shroud portion having a plurality of finger portions interleavable between the bus bars and insulators on the mounting pan.

10. An electric circuit breaker as claimed in claim 9, including locating means on said shroud portion cooperable with the locating means on the one insulator on the mounting pan of the electrical panelboard.

References Cited
UNITED STATES PATENTS

| | | | |
|---|---|---|---|
| 2,120,103 | 6/1938 | Linde | 339—125 X |
| 2,837,699 | 6/1958 | Fore | 317—119 |
| 3,172,014 | 3/1965 | Johnson | 317—119 |
| 3,187,147 | 6/1965 | Dietz et al. | 317—119 X |
| 3,271,626 | 9/1966 | Howrilka | 317—101 |

ROBERT K. SCHAEFER, *Primary Examiner.*

M. GINSBURG, *Assistant Examiner.*